(12) United States Patent
Ojima et al.

(10) Patent No.: US 9,191,119 B2
(45) Date of Patent: Nov. 17, 2015

(54) OPTICAL TRANSMISSION APPARATUS AND OPTICAL TRANSMISSION METHOD

(71) Applicant: FUJITSU LIMITED, Kawasaki-shi, Kanagawa (JP)

(72) Inventors: Hisayuki Ojima, Kawasaki (JP); Hiroshi Iizuka, Kasawaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/229,834

(22) Filed: Mar. 28, 2014

(65) Prior Publication Data

US 2014/0314427 A1    Oct. 23, 2014

(30) Foreign Application Priority Data

Apr. 17, 2013  (JP) ................. 2013-086907

(51) Int. Cl.
  *H04B 10/12*   (2006.01)
  *H04B 10/50*   (2013.01)
  *H04B 10/2507* (2013.01)

(52) U.S. Cl.
  CPC ........... *H04B 10/50* (2013.01); *H04B 10/2507* (2013.01)

(58) Field of Classification Search
  CPC ................ H04B 10/2507; H04B 10/50
  See application file for complete search history.

(56) References Cited

U.S. PATENT DOCUMENTS

| | | | |
|---|---|---|---|
| 7,756,421 B2 | 7/2010 | Roberts et al. | |
| 2002/0154858 A1* | 10/2002 | Kojima | 385/24 |
| 2005/0237124 A1* | 10/2005 | Reimann | 331/176 |
| 2006/0110161 A1* | 5/2006 | Cho et al. | 398/72 |
| 2008/0212982 A1* | 9/2008 | Sato et al. | 398/208 |
| 2010/0073667 A1* | 3/2010 | Cyr et al. | 356/73.1 |
| 2011/0085798 A1* | 4/2011 | Kikuchi | 398/34 |
| 2012/0063768 A1* | 3/2012 | Kim et al. | 398/25 |
| 2012/0106969 A1* | 5/2012 | Ogiwara et al. | 398/79 |
| 2012/0237211 A1* | 9/2012 | Iizuka et al. | 398/26 |
| 2013/0089342 A1* | 4/2013 | Oveis Gharan et al. | 398/208 |
| 2013/0140039 A1* | 6/2013 | Skinner | 166/378 |
| 2014/0314427 A1* | 10/2014 | Ojima et al. | 398/194 |
| 2015/0071656 A1* | 3/2015 | Oyama et al. | 398/194 |
| 2015/0104189 A1* | 4/2015 | Fan et al. | 398/147 |

FOREIGN PATENT DOCUMENTS

| | | |
|---|---|---|
| JP | 2005-341161 A | 12/2005 |
| JP | 2006-522508 A | 9/2006 |
| JP | 2010-28470 A | 2/2010 |
| JP | 2012-099880 | 5/2012 |
| WO | 2004/088883 A1 | 10/2004 |

* cited by examiner

*Primary Examiner* — Ken Vanderpuye
*Assistant Examiner* — Amritbir Sandhu
(74) *Attorney, Agent, or Firm* — Fujitsu Patent Center

(57) ABSTRACT

An optical transmission apparatus receives an optical signal of an optical wavelength. The optical transmission apparatus has a variable wavelength filter, a neighboring frequency detection unit, and an ADC/DSP. The variable wavelength filter detects a neighboring of another optical transmission apparatus that receives an optical signal of a wavelength different from the wavelength. The neighboring frequency detection unit determines whether or not a second frequency supported by the another optical transmission apparatus where a neighboring has been detected by the variable wavelength filter is different from a first frequency supported by the optical transmission apparatus. The ADC/DSP changes a parameter for removing a phase noise from the optical signal of the wavelength according to a difference between the first frequency and the second frequency when it is determined that the second frequency is different from the first frequency.

4 Claims, 10 Drawing Sheets

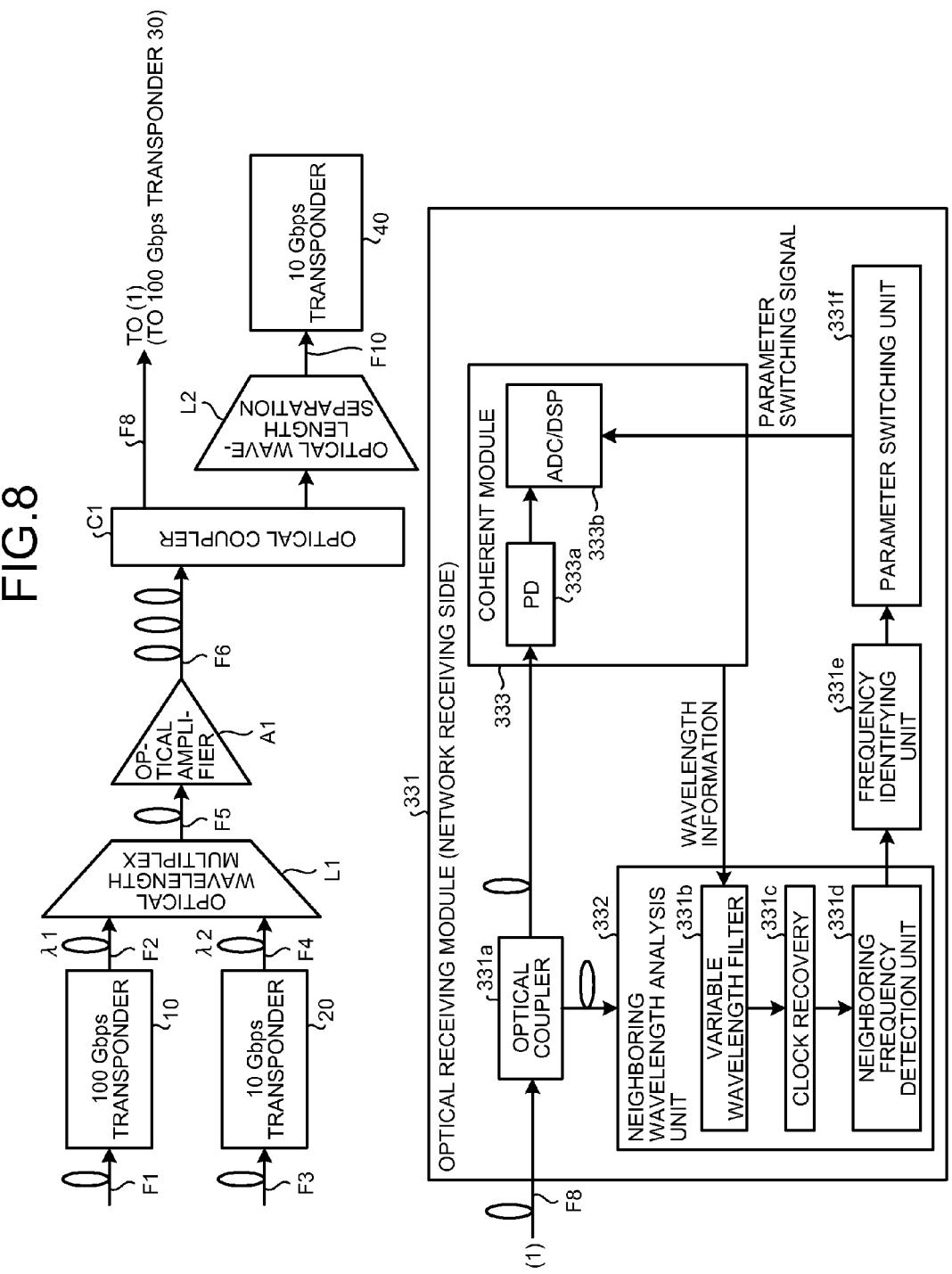

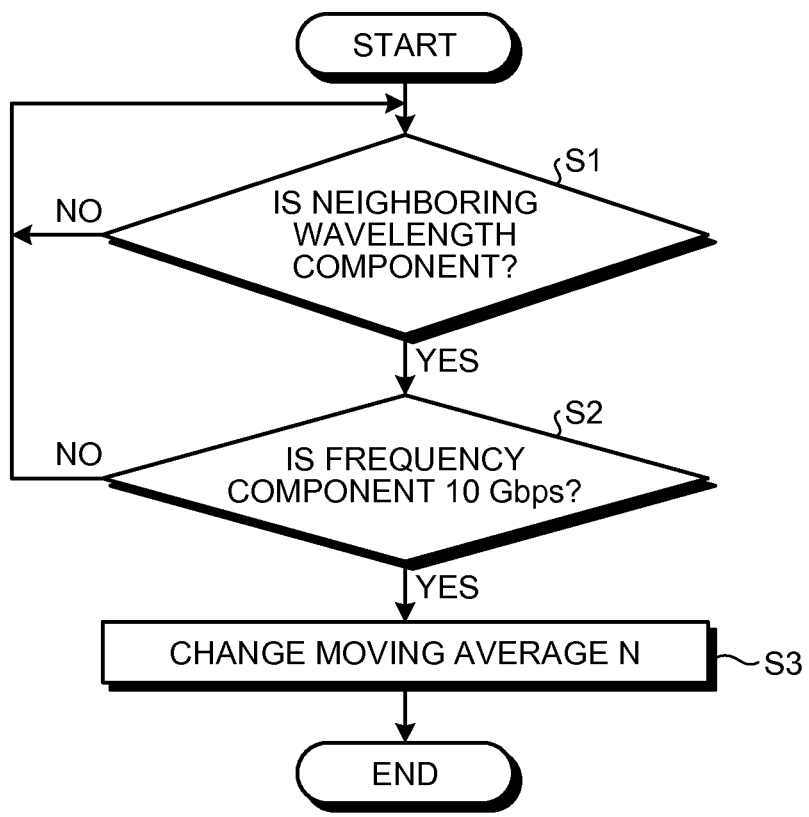

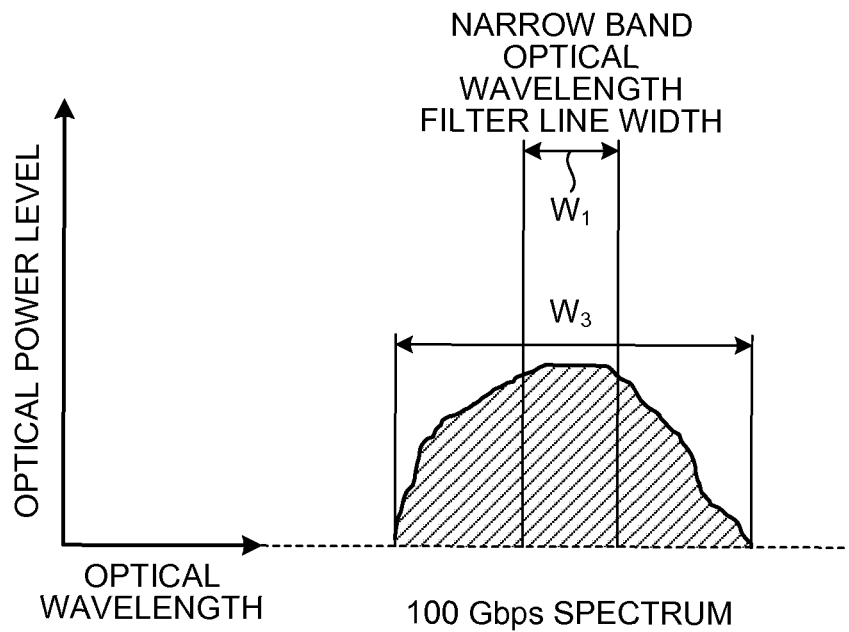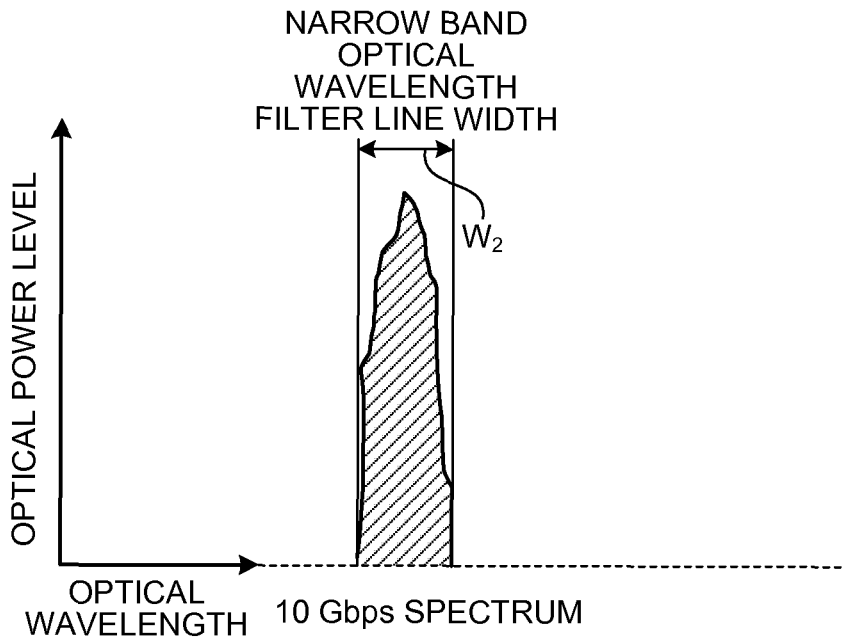

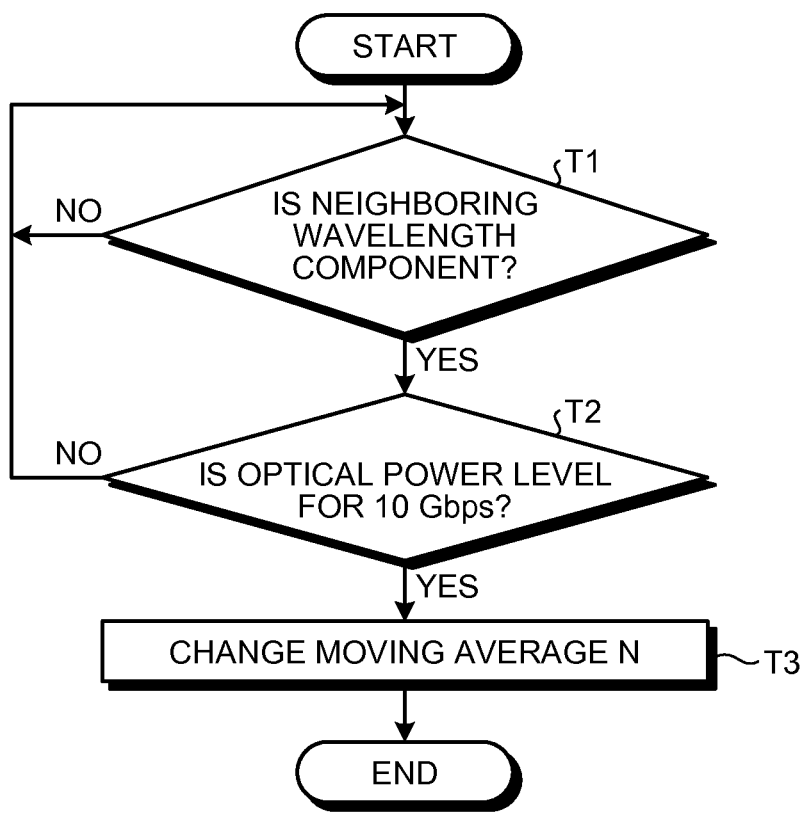

OPTICAL TRANSMISSION APPARATUS AND OPTICAL TRANSMISSION METHOD

CROSS-REFERENCE TO RELATED APPLICATIONS

This application is based upon and claims the benefit of priority of the prior Japanese Patent Application No. 2013-086907, filed on Apr. 17, 2013, the entire contents of which are incorporated herein by reference.

FIELD

The embodiments discussed herein are related to an optical transmission apparatus and an optical transmission method.

BACKGROUND

Conventionally, in optical networks employing the WDM (Wavelength Division Multiplex) system, the optical transmission system having a plurality of transponders has been utilized in both ends of the WDM transmission section. The plurality of transponders correspond to a plurality of different wavelengths, respectively. The optical signal inputted to each transponder via an optical fiber from a router of the optical multiplex side is subjected to optical wavelength conversion at each transponder and then transmitted to the network side. The optical signal transmitted from each transponder is wavelength-multiplexed and then sent out to the WDM transmission section. Upon reaching the optical separation side via the amplification process by the optical amplifier on the WDM transmission section, the sent out optical signal is subjected to the optical wavelength separation. Upon receiving the optical signals on a wavelength basis obtained by the optical wavelength separation from the network side, the plurality of transponders disposed in the optical separation side output them to the corresponding routers in the client side. Thereby, the long distance transmission of the optical signal is implemented.

Patent Document 1: Japanese Laid-open Patent Publication No. 2006-522508
Patent Document 2: Japanese Laid-open Patent Publication No. 2010-028470
Patent Document 3: Japanese Laid-open Patent Publication No. 2005-341161
Patent Document 4: Japanese Laid-open Patent Publication No. 2012-099880

Due to the increase of the traffic amount in recent years, however, the transponder supporting 100 Gbps has been prevalent in addition to the related transponder supporting 10 Gbps. Therefore, the 10 Gbps transponder and the 100 Gbps transponder are mixed in one optical network. In the ITU-T (International Telecommunication Union-Telecommunication standardization sector), because multiple optical wavelengths are arranged in the wavelength grid with the interval of 50 GHz, the transponders for the different optical transmission speeds may be arranged neighboring to each other in the wavelength grid. In this case, due to the difference in the modulation system between the 10 Gbps and the 100 Gbps, the XPM (Cross Phase Modulation) that is the optical non-liner effect affects the 100 Gbps transponder of the phase modulation system from the 10 Gbps transponder of the direct modulation system. This causes the error rate of the 100 Gbps transponder to increase. This results in the reduced transmission quality in the optical transmission system.

The disclosed technique has been made taking the above into consideration and aims to provide an optical transmission apparatus and an optical transmission method that is able to quickly suppress the reduction in the transmission quality due to the addition of the neighboring wavelength.

SUMMARY

According to an aspect of the embodiments, an optical transmission apparatus receives an optical signal of a first wavelength. The optical transmission apparatus includes a detection unit, a determination unit, and a changing unit. The detection unit detects a neighboring of another optical transmission apparatus configured to receive an optical signal of a second wavelength that is different from the first wavelength. The determination unit determines whether or not a second frequency supported by the another optical transmission apparatus where a neighboring has been detected by the detection unit is different from a first frequency supported by the optical transmission apparatus. The changing unit changes a parameter for removing a phase noise from the optical signal of the first wavelength according to a difference between the first frequency and the second frequency when it is determined that the second frequency is different from the first frequency by the determination unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a view illustrating a configuration of an optical receiving module of a receiving side of a narrow band type optical transceiver module according to a first embodiment;

FIG. 9 is a flowchart for illustrating a process of changing the moving average performed in the transponder according to the first embodiment;

FIG. 10A is a view illustrating an optical spectrum in 100 Gbps;

FIG. 10B is a view illustrating an optical spectrum in 10 Gbps;

FIG. 12 is a flowchart for illustrating a process of changing the moving average performed in the transponder according to the second embodiment.

DESCRIPTION OF EMBODIMENTS

Preferred embodiments will be explained with reference to accompanying drawings. It is noted that the optical transmission apparatus and the optical transmission method disclosed by the present application are not limited by the following embodiments.

[a] First Embodiment

Figure 1:
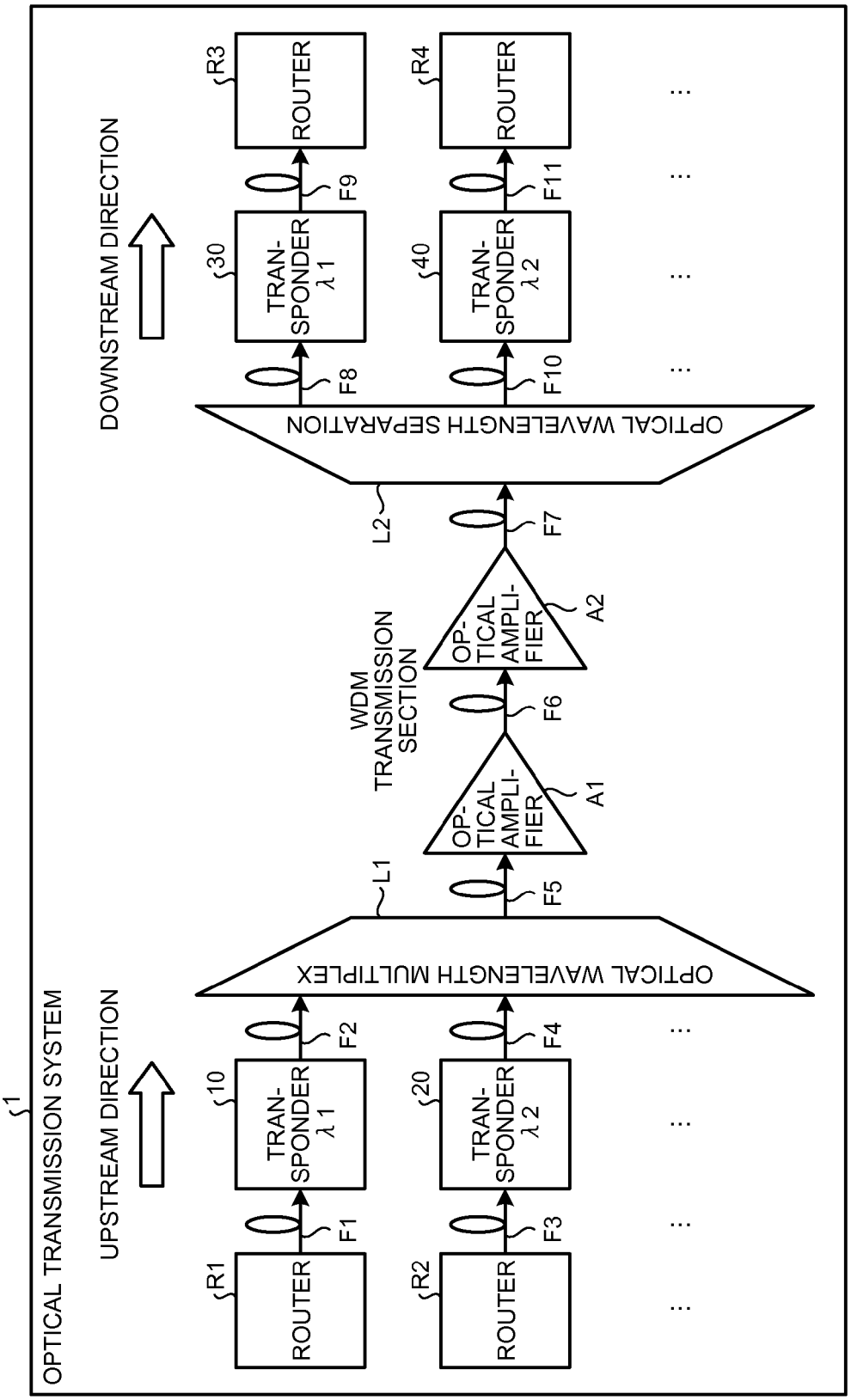
FIG. 1 is a view illustrating a configuration of an optical transmission system.

Firstly, described will be the configuration of an optical transmission system according to one embodiment disclosed by the present application. FIG. 1 is a view illustrating the configuration of an optical transmission system 1. As illustrated in FIG. 1, the optical transmission system 1 has transponders 10 and 20 in order to use the WDM for a larger capacity to transmit each light of the wavelengths by the light whose optical spectrum is thin. Respective transponders 10 and 20 perform optical wavelength conversion for the optical signals received via optical fibers F1 and F3 from respective routers R1 and R2. The optical signal after the wavelength conversion is subjected to the optical wavelength multiplex and then amplified at an optical amplifier A1, and transmitted for a long distance by an optical fiber F6. The optical signal whose optical power level is attenuated by the long distance transmission is re-amplified at an optical amplifier A2 and then subjected to the optical wavelength separation. The optical signals of respective wavelengths subjected to the optical wavelength separation are received by transponders 30 and 40 corresponding to respective wavelengths, and then transmitted to routers R3 and R4 via optical fibers F9 and F11, respectively.

Figure 2:
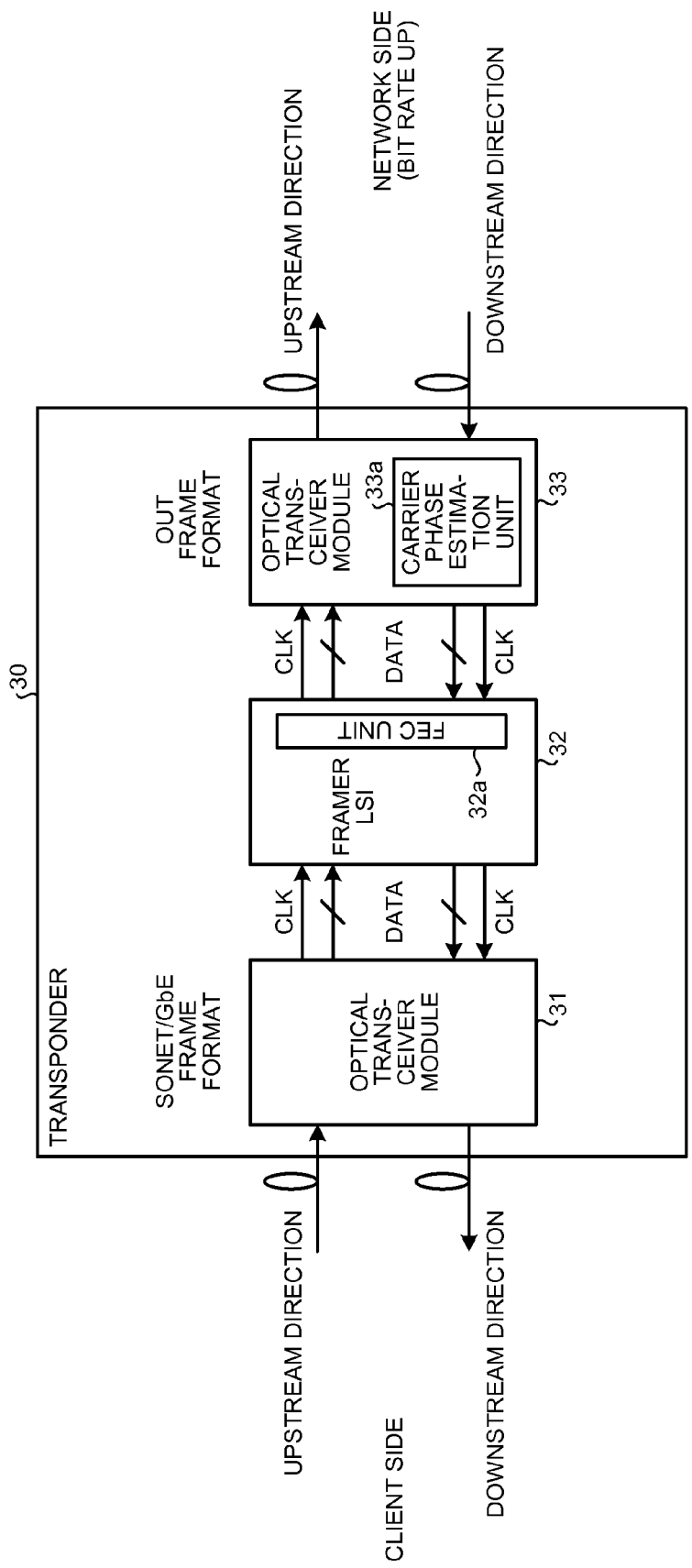
FIG. 2 is a view illustrating a configuration of a transponder.

FIG. 2 is a view illustrating the configuration of the transponder 30. As illustrated in FIG. 2, the transponder 30 has at least a broadband type optical transceiver module 31, a framer LSI (Large Scale Integration) 32, and a narrow band type optical transceiver module 33. These respective elements are connected so that the signal and/or data can be inputted and outputted unidirectionally or interactively.

The broadband type optical transceiver module 31 receives an optical signal by the usual optical spectrum (Wide Band) from the client side router R1 and converts the optical signal into an electrical signal. The framer LSI 32 performs a frame process such as SONET (Synchronous Optical NETwork)/GbE (Gigabit Ethernet (trademark)) to the electrical signal inputted from the optical transceiver module 31. In particular, in order to suppress the error due to the waveform degradation caused by the long distance transmission and/or the degradation of the OSNR (Optical Signal Noise Ratio) at the optical amplifiers A1 and A2, an FEC (Forward Error Correction) unit 32a adds an error correction code to the above-described electrical signal. The narrow band type optical transceiver module 33 converts the electrical signal inputted from the framer LSI 32 into the optical signal again.

In order to support the high speed of 100 Gbps, the narrow band type optical transceiver module 33 uses a digital coherent module such as an ADC/DSP (Analog to Digital Converter/Digital Signal Processor), for example, at the optical receiving side. The digital coherent module is able to change the reception characteristics by changing the parameter of the digital processing.

Figure 3:
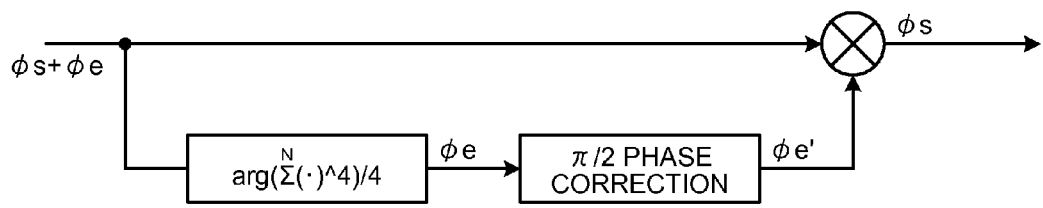
FIG. 3 is a view for illustrating a process of a carrier phase estimation unit of the transponder.

Since the digital coherent module at the light receiving side includes known and common techniques except for the carrier phase estimation unit, the process in the carrier phase estimation unit will be described below by referring to FIG. 3. FIG. 3 is a view for illustrating the process of a carrier phase estimation unit 33a of the transponder 30. In order to perform a phase modulation, the carrier phase estimation unit 33a estimates the phase of the carrier by removing the phase noise by a fourth power method. Specifically, a moving average N illustrated in FIG. 3 is a parameter for removing the phase noise, and the digital coherent module controls the moving average N to a proper value to make optimization between the 100 Gbps and the 10 Gbps. For example, the carrier phase estimation unit 33a removes the phase noise by dividing the fourth power of the result of the digital process by four as illustrated in FIG. 3.

Figure 4:
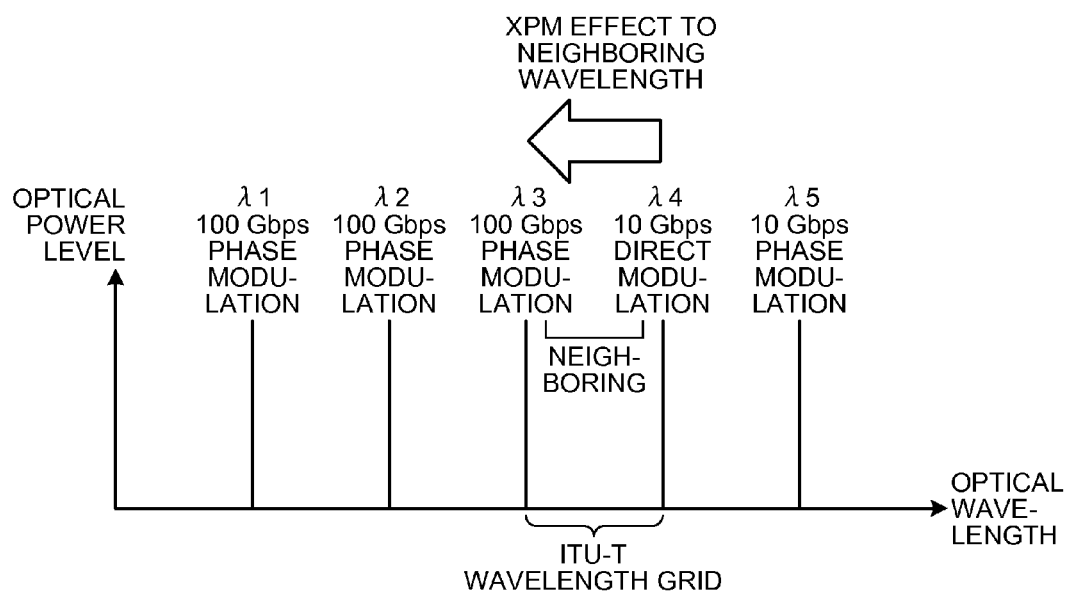
FIG. 4 is a view for illustrating an effect of the XPM to a neighboring wavelength.

FIG. 4 is a view for illustrating the effect of the XPM to the neighboring wavelength. In FIG. 4, the wavelength is defined in the horizontal axis, and the optical power level is defined in the vertical axis. As illustrated in FIG. 4, the ITU-T wavelength grid is configured by a plurality of different optical wavelengths $\lambda 1$ to $\lambda 5$ by 50 GHz interval, for example. While there is no effect of the XPM to the neighboring wavelength in the 100 Gbps phase modulation interval such as the optical wavelengths $\lambda 1$ to $\lambda 3$, the modulation system is different between the optical wavelengths $\lambda 3$ and $\lambda 4$. Therefore, the XPM affects the 100 Gbps, $\lambda 3$ side that employs the phase modulation from the 10 Gbps, $\lambda 4$ side that employs the direct modulation (the intensity modulation of 1, 0) system.

In the WDM line of only 100 Gbps ($\lambda 1$ to $\lambda 3$ of FIG. 4), a relatively larger value such as "10", for example, is proper for the value of the moving average N. In contrast, when the 10 Gbps transponder is arranged adjacent to the 100 Gbps transponder, a relatively smaller value such as "2", for example, is proper for the value of the moving average N. While details will be described later, the 100 Gbps transponder 30 is able to suppress the increase of the error rate by switching the above-described moving average N, even when the 10 Gbps transponder is added to its neighbor.

While the configuration of the transponder 30 has been exemplified above, the configurations of other transponders 10, 20, and 40 are the same as that of the transponder 30. Thus, the element common to each other is provided with the reference numeral whose last digit is the same, and its depiction and detailed description will be omitted.

Figure 5:
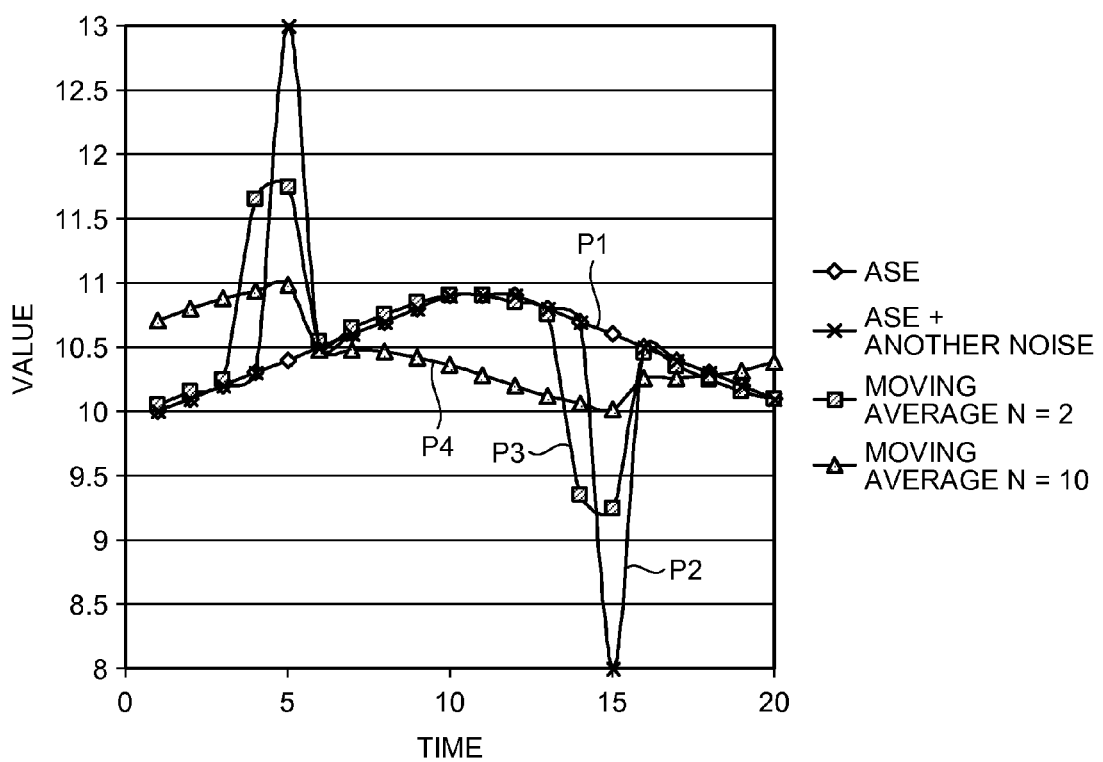
FIG. 5 is a view for illustrating a displacement of estimation on a moving average basis in a case where the ASE (Amplified Spontaneous Emission) is dominant.

FIG. 5 is a view for illustrating a displacement of the estimation on a moving average basis in the case where the ASE (Amplified Spontaneous Emission) is dominant. In FIG. 5, time is defined in the horizontal axis, and numerical value is defined in the vertical axis. When there is no effect by the neighboring of the 10 Gbps transponder, the component of the ASE will be dominant. Thus, the carrier phase estimation unit 33a of the optical transceiver module 33 of the transponder 30 estimates the ASE component and, because of the slow changing speed, the ASE component represents a gentle curve as depicted by a curve P1 (the plot with diamonds) of FIG. 5. When another noise is further added to the ASE component, however, the numerical value fluctuates significantly at the time of "5" and "15" as depicted by a curve P2 (the plot with X-mark) of FIG. 5. It is noted that another noise refers to other noise than the noise of the optical amplifiers A1 and A2 and is the noise caused by the instantaneous vibration of the optical fibers F8 and F9 and the like.

When the above-described another noise is added and when the moving average is N=2, the above numerical value responds greatly to the noise as depicted by a curve P3 (the plot with squares) of FIG. 5. As a result, there is a great difference from the expected level estimation value of the ASE. On the other hand, when the moving average is N=10, the above numerical value does not respond so greatly to the noise as depicted by a curve P4 (the plot with triangles) of FIG. 5. As a result, there is no significant difference from the expected level estimation value of the ASE. In other words, the numerical value when the moving average N=10 makes it easier to follow to the ASE component regardless of presence or absence of the above-described another noise. Thus, the carrier phase estimation unit $33a$ is able to estimate the ASE with higher accuracy in the case of the moving average N=10 than in the case of the moving average N=2. Therefore, when the ASE is dominant, the value of the moving average N is more preferably "10" than "2".

Figure 6:
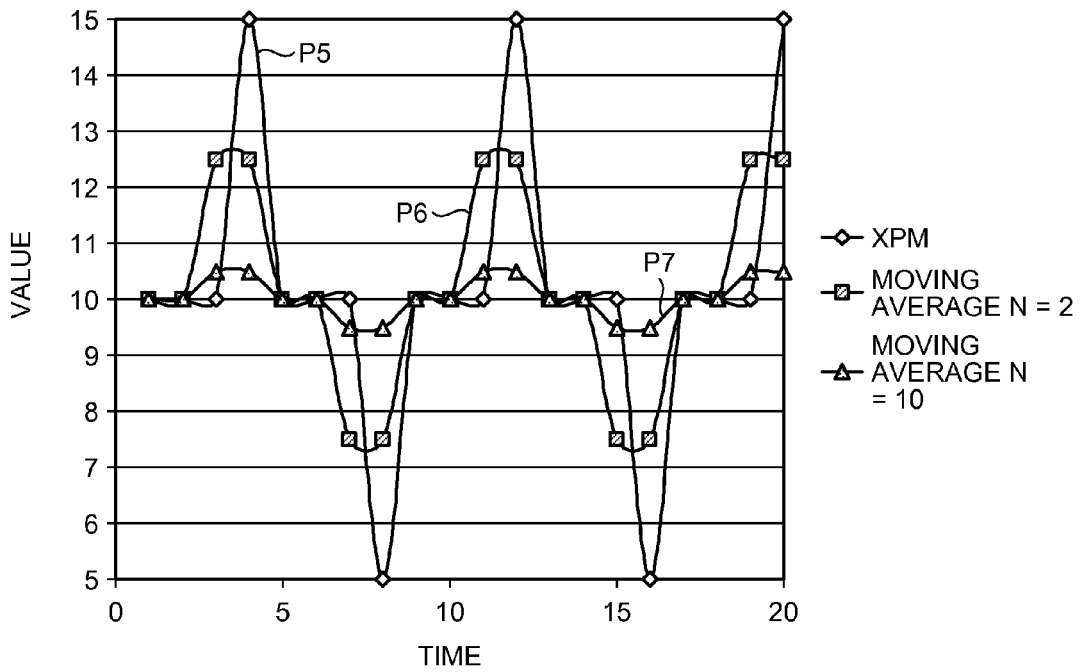
FIG. 6 is a view for illustrating a displacement of estimation on a moving average basis in a case where the XPM (Cross Phase Modulation) is dominant.

On the other hand, FIG. 6 is a view for illustrating the displacement of the estimation on a moving average basis in the case where the XPM (Cross Phase Modulation) is dominant. When the XPM is dominant, the result is opposite to the case of the ASE being dominant. When there is an effect by the neighboring of the 10 Gbps transponder, the component of the XPM will be dominant. Thus, the carrier phase estimation unit $33a$ of the optical transceiver module 33 of the transponder 30 estimates the XPM component and, because of the fast changing speed due to the non-liner effect, the XPM component represents a curve with sudden changes as depicted by a curve P5 (the plot with diamonds) of FIG. 6.

When the XPM is dominant and the moving average is N=2, the above numerical value exhibits such movement that it follows to the XPM estimation (P5) as depicted by a curve P6 (the plot with squares) of FIG. 6. On the other hand, when the moving average N=10, the above numerical value does not respond greatly as depicted by a curve P7 (the plot with triangles) of FIG. 6. As a result, there is a great difference from the level estimation value of the expected XPM. Thus, when the fast component such as the XPM component is estimated, the moving average N of 2 rather than 10 allows for a highly accurate estimation in the carrier phase estimation unit $33a$. That is, when the XPM is dominant, the value of the moving average N is more preferably "2" than "10".

As described above, the optimal value of the moving average N is different depending on which of the ASE or the XPM is dominant. It is thus desirable for the transponder 30 to variably-control the moving average N depending on the presence or absence of the neighboring of the 10 Gbps transponder, in terms of maintaining the good transmission quality.

Figure 7:
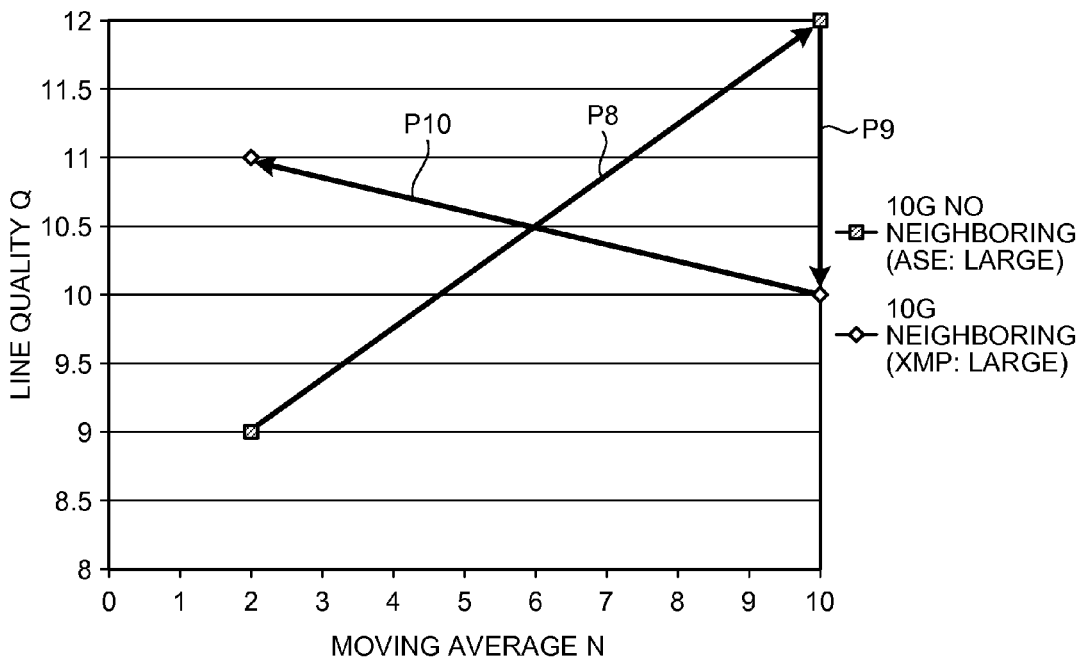
FIG. 7 is a view illustrating a relationship between the moving average and a line quality for each case of presence and absence of the neighboring of the 10 Gbps.

FIG. 7 is a view illustrating a relationship between the moving average N and a line quality Q for each case of presence and absence of the neighboring of the 10 Gbps. In FIG. 7, the moving average N is defined in the horizontal axis, and the line quality Q (Quality factor) is defined in the vertical axis. The larger value of the line quality Q represents a better state of the optical transmission characteristics, while the smaller value represents a poorer state of the optical transmission characteristics. Firstly, when there is no neighboring of the 10 Gbps transponder to the 100 Gbps transponder, the effect of the ASE is greater than that of the XPM. Therefore, as depicted by a line P8 (the plot with squares) of FIG. 7, a larger moving average N results in better optical transmission characteristics. Next, when the 10 Gbps transponder is added adjacent to the 100 Gbps transponder, the XPM is dominant compared to the ASE. In response, the line quality Q is degraded as depicted by a line P9 of FIG. 7. Therefore, in response that the transponder 30 decreases the moving average N from 10 to 2, the line quality Q improves. That is, when the effect of the XPM is greater than that of the ASE, a smaller moving average N results in better optical transmission characteristics as depicted by a line P10 (the plot with diamonds) of FIG. 7.

If the transponder 30 set the moving average N to an excessively large value, this would result in the increased amount of the calculation and therefore result in the increased load and/ or circuit scale of the processor and/or the increased consumption power. Therefore, the upper limit of the moving average N is desirably around 10. In contrast, if the transponder 30 set the moving average N to an excessively small value, this would make the moving average useless and therefore the accurate calculation result would be unlikely to be obtained depending on the line state of the WDM. Thus, the lower limit of the moving average N is desirably around 2.

As described above, the transponder 30 is able to improve the error rate by the parameter change of the moving average N. Therefore, if the transponder 30 is able to instantaneously detect that the 10 Gbps transponder is added in the neighboring wavelength, the above-described parameter change can be quickly made.

FIG. 8 is a view illustrating the configuration of the optical receiving module 331 of the receiving side of the narrow band type optical transceiver module 33 according to a first embodiment. As illustrated in FIG. 8, the optical signal received via the WDM transmission path F6, which is divided at an optical coupler C1, includes the information of the neighboring wavelengths, because it is merely divided at this time. The divided optical signal is inputted to the optical receiving module 331 in the receiving side of the optical transceiver module 33 via the optical fiber F8.

As illustrated in FIG. 8, the optical receiving module 331 has an optical coupler $331a$, a neighboring wavelength analysis unit 332, a frequency identifying unit $331e$, a parameter switching unit $331f$, and a coherent module 333. Further, the neighboring wavelength analysis unit 332 has a variable wavelength filter $331b$, a clock recovery $331c$, and a neighboring frequency detection unit $331d$. Furthermore, the coherent module 333 has a PD (Photo Diode) $333a$ and an ADC/DSP $333b$. These respective elements are connected so that the signal and/or data can be inputted and outputted unidirectionally or interactively.

After again dividing the above-described optical signal, the optical coupler $331a$ outputs the primary signal to the coherent module 333 and outputs the secondary signal to the variable wavelength filter $331b$. The variable wavelength filter $331b$ obtains wavelength information (for example, λ1) from the coherent module 333 and extracts the neighboring component of the wavelength information (the left or the right wavelength on the ITU-T wavelength grid, for example, λ2). Further, after photoelectric conversion of the neighboring component by the PD $333a$, the variable wavelength filter $331b$ generates the electric data waveform and outputs it to the clock recovery $331c$ in the post stage. The clock recovery $331c$ regenerates the clock frequency from the data component of the above electric data waveform and notifies the regenerated clock to the neighboring frequency detection unit $331d$ in the post stage. The neighboring frequency detection unit $331d$ detects the frequency of the regenerated clock notified from the clock recovery $331c$ and outputs frequency information to the frequency identifying unit $331e$.

The frequency identifying unit $331e$ identifies whether or not the frequency information inputted from the neighboring frequency detection unit $331d$ is the frequency (for example, 10 Gbps) that may degrade the speed characteristics of 100 Gbps of the transponder 30 itself. The parameter switching unit $331f$ performs the switching between the optimal value of the moving average N for the case of only 100 Gbps and the optimal value of the moving average N for the case of the 10 Gbps neighboring. Specifically, when the frequency component of 10 Gbps is not detected, the parameter switching unit $331f$ instructs the parameter switching to the optimal value (for example, 10) of the moving average N for the case of only 100 Gbps. On the other hand, when the frequency component of the 10 Gbps is detected, the parameter switching unit $331f$ instructs the parameter switching to the optimal value (for example, 2) of the moving average N for the case of the 10 Gbps neighboring. These instructions are provided by that the parameter switching unit 331*f* outputs a parameter switching signal including a new moving average N to the coherent module 333.

Next, the operation will be described. FIG. 9 is a flowchart for illustrating the process of changing the moving average performed by the transponder 30 according to the first embodiment. In Step S1 of FIG. 9, the variable wavelength filter 331*b* determines whether or not there is a neighboring wavelength component. If there is a neighboring wavelength component as the result of the determination (Step S1; Yes), the neighboring frequency detection unit 331*d* determines that a new transponder has been added, and determines whether or not the frequency component of the transponder is 10 Gbps (Step S2). If the frequency component is 10 Gbps as the result of the determination (Step S2; Yes), the ADC/DSP 333*b* changes the moving average N (Step S3) according to the instruction of the parameter switching signal inputted from the parameter switching unit 331*f*. The ADC/DSP 333*b* changes the moving average N from 10 to 2, for example.

It is noted that, if there is no neighboring wavelength component as the result of determination of the above Step S1 (Step S1; No) or if the frequency component is not of the 10 Gbps as the result of determination in the above Step S2 (Step S2; No), the XPM does not increase. Therefore, the process of changing the moving average returns to Step S1 and the variable wavelength filter 331*b* continues to monitor whether or not there is a neighboring wavelength component.

As described above, the transponder 30 receives the optical signal of the optical wavelength λ1. The transponder 30 has the variable wavelength filter 331*b*, the neighboring frequency detection unit 331*d*, and the ADC/DSP 333*b*. The variable wavelength filter 331*b* detects the neighboring (addition) of other transponder 40 that receives the optical signal of the optical wavelength λ2 that is different from the optical wavelength λ1. The neighboring frequency detection unit 331*d* determines whether or not the second frequency (for example, 10 Gbps) supported by other transponder 40 where the neighboring has been detected by the variable wavelength filter 331*b* is different from the first frequency (for example, 100 Gbps) supported by the transponder 30. When it is determined that the second frequency is different from the first frequency by the neighboring frequency detection unit 331*d*, the ADC/DSP 333*b* changes the parameter (for example, the moving average N) for removing the phase noise from the optical signal of the optical wavelength λ1 depending on which of the first frequency and the second frequency is the higher or lower.

In the transponder 30, when the first frequency is higher than the second frequency, the ADC/DSP 333*b* may decrease the value of the above-described parameter. For example, the ADC/DSP 333*b* decreases the value of the moving average N from "10" to "2". Further, in the transponder 30, the neighboring frequency detection unit 331*d* may determine whether or not the second frequency is different from the first frequency based on the result of the comparison between the frequency component of the transponder 30 and that of other transponder 40.

As described above, the transponder 30 extracts the neighboring wavelength component and, by that information, changes the parameter of the calculation process by the DSP. That is, the transponder 30 always monitors the frequency component of the neighboring wavelength grid and instantaneously detects another frequency component by hardware in response that another frequency (another modulation system) is added to the neighboring wavelength. This allows the transponder 30 to change the calculation parameter of the digital coherent module. As a result, this allows for the quick avoidance of the degradation of the error rate due to the addition of the neighboring wavelength.

[b] Second Embodiment

Next, a second embodiment will be described. The optical transmission system according to the second embodiment has a similar configuration to the optical transmission system 1 according to the first embodiment illustrated in FIG. 1 except for the transponder. Further, the configuration of the transponder according to the second embodiment is similar to the configuration of the transponders 10, 20, 30, and 40 according to the first embodiment illustrated in FIG. 2 except for the optical receiving module described later. Therefore, in the second embodiment, the same reference numerals are used for the elements common to the first embodiment, and the depiction and the detailed description thereof will be omitted.

The second embodiment is different from the first embodiment in the detection method of the neighboring wavelength component of 10 Gbps. Specifically, in the first embodiment, the optical receiving module 331 at the receiving side of the narrow band type optical transceiver module 33 directly detects the neighboring wavelength component of 10 Gbps based on the frequency component. In contrast, in the second embodiment, the optical receiving module 331 performs an indirect detection based on the optical power level without detecting the frequency component. In the following description, the configuration and the operation of such optical receiving module 331 according to the second embodiment will be described by referring to FIG. 10A to FIG. 12 in focusing the difference from the first embodiment.

FIG. 10A is a view illustrating the optical spectrum in the 100 Gbps. FIG. 10B is a view illustrating the optical spectrum in the 10 Gbps. In FIG. 10A and FIG. 10B, the optical wavelength is defined in the horizontal axis, and the optical power level is defined in the vertical axis. The hatched areas of FIG. 10A and FIG. 10B represent the integrated value of the optical power level, that is, the total optical power level.

As illustrated in FIG. 10A and FIG. 10B, since the 10 Gbps direct modulation (intensity modulation) is lower in the signal light frequency than the 100 Gbps phase modulation, the optical spectrum width is narrow. However, the light inputted to the WDM line is inputted with the same value of the total power level of the signal light. The optical receiving module 331 extracts the optical signal using the optical wavelength filter of the same narrow band width ($W_1$ of FIG. 10A=$W_2$ of FIG. 10B). Therefore, even if the total optical power levels (hatched areas) are the same between the 10 Gbps and the 100 Gbps, a higher optical power level is measured for the 10 Gbps due to the narrower optical spectrum width ($W_3$ of FIG. 10A>$W_2$ of FIG. 10B). The optical receiving module 331 thus is able to determine whether or not the neighboring wavelength component is 10 Gbps based on which of the measured optical power levels is the higher or lower.

Figure 11:
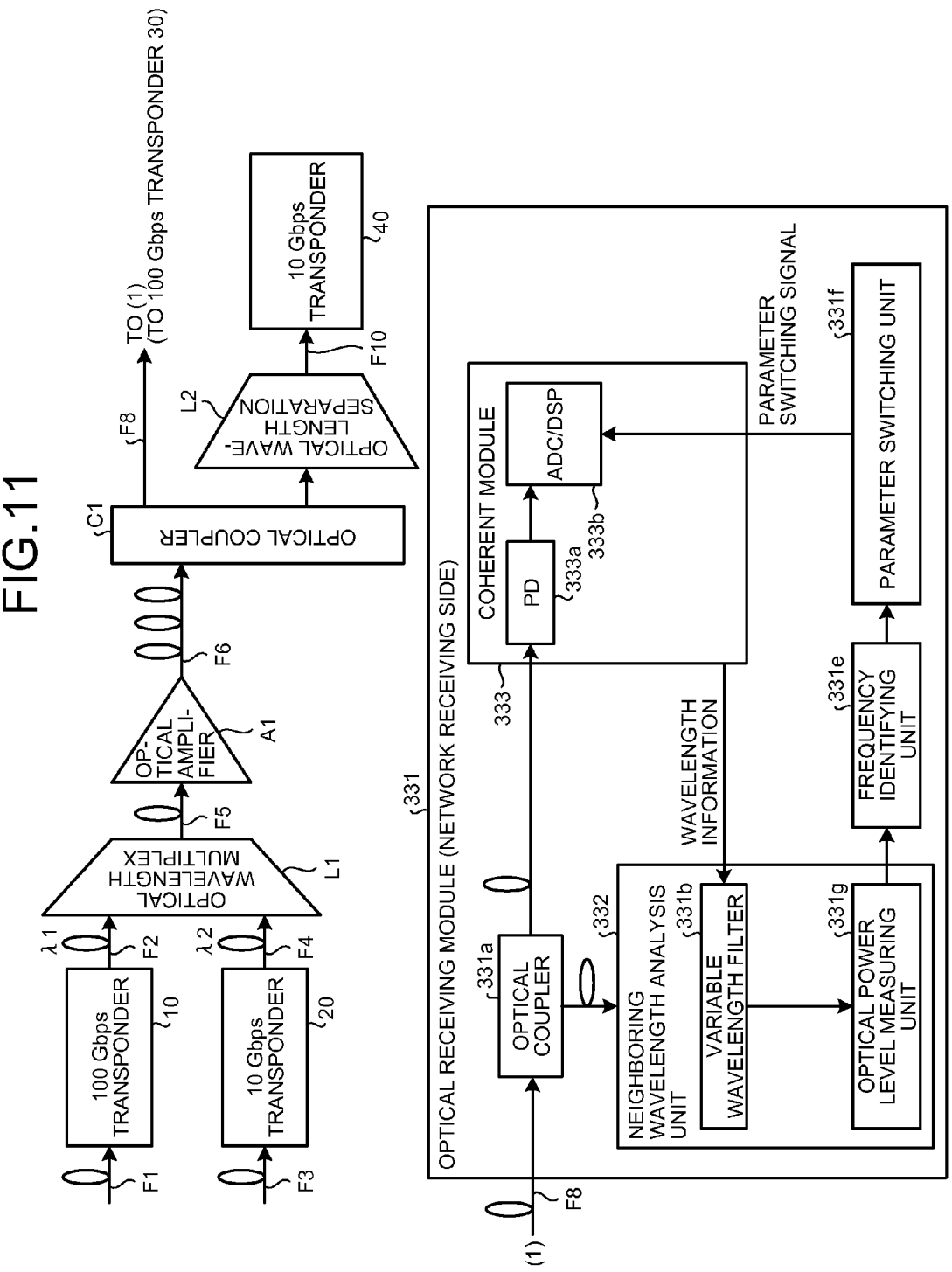
FIG. 11 is a view illustrating a configuration of an optical receiving module of a receiving side of a narrow band type optical transceiver module according to a second embodiment.

FIG. 11 is a view illustrating the configuration of the optical receiving module 331 of the receiving side of the narrow band type optical transceiver module 33 according to the second embodiment. The configuration of the optical receiving module according to the second embodiment is similar to the optical receiving module 331 according to the first embodiment illustrated in FIG. 8 except for the neighboring wavelength analysis unit, the frequency identifying unit, and the parameter switching unit as described later. Therefore, in the second embodiment, the same reference numerals are used for the elements common to the first embodiment, and the depiction and the detailed description thereof will be omitted.

The neighboring wavelength analysis unit 332 has the variable wavelength filter 331b and an optical power level measuring unit 331g. The variable wavelength filter 331b acquires wavelength information (for example, λ1) from the coherent module 333 and sets a frequency band of the variable wavelength filter 331b (for example, a narrow band around 1 nm) by using the wavelength information. Further, the variable wavelength filter 331b converts the light that has passed the frequency band of the variable wavelength filter 331b into the electrical signal by the PD 333a. The optical power level measuring unit 331g measures the power level of the photoelectric-converted light and outputs the value of the measured optical power level to the frequency identifying unit 331e.

The frequency identifying unit 331e identifies whether or not the frequency of the added transponder is the frequency (for example, 10 Gbps) that can degrade the speed characteristics of the 100 Gbps of the transponder 30 itself based on the value of the optical power level input from the optical power level measuring unit 331g. The parameter switching unit 331f performs the switching between the optimal value of the moving average N for the case of only 100 Gbps and the optimal value of the moving average N for the case of the 10 Gbps neighboring. Specifically, if the measured result of the optical power level is less than a threshold (for example, approximately −20 dBm), the parameter switching unit 331f instructs the parameter switching to the optimal value of the moving average N (for example, 10) for the case of only 100 Gbps. On the other hand, if the measured result of the optical power level is greater than or equal to the threshold (for example, approximately −20 dBm), the parameter switching unit 331f instructs the parameter switching to the optimal value of the moving average N (for example, 2) for the case of the 10 Gbps neighboring. These instructions are provided by that the parameter switching unit 331f outputs a parameter switching signal including a new moving average N to the coherent module 333.

Next, the operation will be described. FIG. 12 is a flowchart for illustrating the process of changing the moving average performed by the transponder 30 according to the second embodiment. In Step T1 of FIG. 12, the variable wavelength filter 331b determines whether or not there is a neighboring wavelength component. If there is a neighboring wavelength component as the result of the determination (Step T1; Yes), the optical power level measuring unit 331g determines that a new transponder has been added, and determines whether or not the frequency component of the transponder is of the 10 Gbps (Step T2). The determination is made based on the measured value of the optical power level. For example, if the measured value of the optical power level is less than a threshold, the optical power level measuring unit 331g determines that the above frequency component is not of the 10 Gbps. On the other hand, if the measured value of the optical power level is greater than or equal to the threshold, the optical power level measuring unit 331g determines that the above frequency component is of the 10 Gbps.

If the frequency component is of the 10 Gbps as the result of the determination (Step T2; Yes), the ADC/DSP 333b changes the moving average N according to the instruction of the parameter switching signal inputted from the parameter switching unit 331f (Step T3). The ADC/DSP 333b changes the moving average N from 10 to 2, for example.

It is noted that, if there is no neighboring wavelength component as the result of determination of the above Step T1 (Step T1; No) or if the frequency component is not of the 10 Gbps as the result of determination in the above Step T2 (Step T2; No), the XPM does not increase. Therefore, the process of changing the moving average returns to Step T1 and the variable wavelength filter 331b continues to monitor whether or not there is a neighboring wavelength component.

As described above, in the transponder 30, the neighboring frequency detection unit 331d may determine whether or not the second frequency is different from the first frequency based on the result of the comparison between the optical power level of the transponder 30 and the optical power level of other transponder 40. That is, the transponder 30 extracts the neighboring wavelength component and, by the information, changes the parameter of the calculation process by the DSP. That is, the transponder 30 always monitors the frequency component of the neighboring wavelength grid and instantaneously detects another frequency component by hardware in response that another frequency (another modulation system) is added to the neighboring wavelength. This allows the transponder 30 to change the calculation parameter of the digital coherent module. As a result, this allows for the quick avoidance of the degradation of the error rate due to the addition of the neighboring wavelength.

It is noted that, in each of the above-described embodiments, it has been described that the 10 Gbps transponder 40 is added to the neighbor of the 100 Gbps transponder 30. In contrast, however, the present invention is applicable to the case where the 100 Gbps transponder is added to the neighbor of the 10 Gbps transponder. Further, the frequency component of the existing transponder and the added transponder are not limited to 100 Gbps and 10 Gbps and may be 200 Gbps, 400 Gbps, and so on.

Further, in each of the above-described embodiments, it has been described that, when the transponder of the neighboring wavelength is added, the existing transponder decreases the moving average N. However, the present invention is not limited to the case that the transponder is added, but is applicable to the case that the transponder is removed. For example, when the 10 Gbps transponder 40 is removed from the neighbor of the 100 Gbps transponder 30, the transponder 30 may increase the moving average N from 2 to 10, because the XPM is larger than the ASE. This allows for the improved line quality Q.

Furthermore, in each of the above-described embodiments, it has been described that the 100 Gbps transponder 30 decreases the moving average N from 10 to 2 in response to the addition of the 10 Gbps transponder 40. However, the moving average N does not always be changed by two steps, and may be changed continuously according to the supported frequency of the added or removed transponder. For example, the 100 Gbps transponder 30 maintains the moving average N=10 when the supported frequency of the added transponder is 100 Gbps, while changes the moving average N to "5" when the supported frequency of the added transponder is 50 Gbps. This allows for the improved applicability to the neighboring frequency in the transponder 30 and for the construction of the highly flexible optical transmission system 1.

Furthermore, in each of the above-described embodiments, each element of the transponder 30 is not always required to be configured as depicted in a physical sense. That is, the specific form of the distribution and/or the integration of respective devices are not limited to what are depicted, and thus all of or a part of them may be distributed and/or integrated by any unit in a functional sense or a physical sense depending on the load, the usage, and the like of respective elements. For example, the frequency identifying unit 331e and the parameter switching unit 331f or, alternatively, the variable wavelength filter 331b and the optical power level measuring unit 331g may be integrated into one element, respectively. In contrast, regarding the variable wavelength filter 331b, distributed may be the part for extracting the neighboring component of the wavelength information obtained from the coherent module 333 and the part for photoelectric-converting the neighboring component to generate the electric data waveform. Furthermore, the memory that stores the parameter such as the moving average N and the threshold of the optical power level may be an external device of the transponder 30 and be connected via the network and/or the cable.

One aspect of the optical transmission apparatus disclosed by the present application allows for the quick suppression of the reduction in the transmission quality due to the addition of the neighboring wavelength.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission apparatus that receives an optical signal of a first wavelength, the optical transmission apparatus comprising:
    a detection unit that detects a neighboring of another optical transmission apparatus configured to receive an optical signal of a second wavelength that is different from the first wavelength;
    a determination unit that determines whether or not a second frequency supported by the another optical transmission apparatus where the neighboring has been detected by the detection unit is different from a first frequency supported by the optical transmission apparatus; and
    a changing unit that changes a parameter, which is a moving average N which has to be changed to an optimal value, for removing a phase noise from the optical signal of the first wavelength according to a difference between the first frequency and the second frequency when it is determined that the second frequency is different from the first frequency by the determination unit, wherein
    the determination unit determines whether or not the second frequency is different from the first frequency based on a result of a comparison between a frequency component of the optical transmission apparatus and a frequency component of the another optical transmission apparatus, and
    the determination unit always monitors the frequency component of a neighboring wavelength grid and instantaneously detects another frequency component by hardware in response that another frequency is added to the neighboring wavelength.

2. The optical transmission apparatus according to claim 1, wherein the changing unit decreases a value of the parameter when the first frequency is higher than the second frequency.

3. The optical transmission apparatus according to claim 1, wherein the determination unit determines whether or not the second frequency is different from the first frequency based on a result of a comparison between an optical power level of the optical transmission apparatus and an optical power level of the another optical transmission apparatus.

4. An optical transmission method comprising:
    at an optical transmission apparatus that receives an optical signal of a first wavelength,
    detecting a neighboring of another optical transmission apparatus configured to receive an optical signal of a second wavelength that is different from the first wavelength;
    determining whether or not a second frequency supported by the another optical transmission apparatus where the neighboring has been detected by the detection unit is different from a first frequency supported by the optical transmission apparatus; and
    changing a parameter, which is a moving average N which has to be changed to an optimal value, for removing a phase noise from the optical signal of the first wavelength according to a difference between the first frequency and the second frequency when it is determined that the second frequency is different from the first frequency, wherein
    the determining includes determining whether or not the second frequency is different from the first frequency based on a result of a comparison between a frequency component of the optical transmission apparatus and a frequency component of the another optical transmission apparatus and
    the determining includes always monitoring the frequency component of a neighboring wavelength grid and instantaneously detecting another frequency component by hardware in response that another frequency is added to the neighboring wavelength.

* * * * *